(12) United States Patent
Gahleitner et al.

(10) Patent No.: US 9,353,252 B2
(45) Date of Patent: May 31, 2016

(54) SOFT POLYPROPYLENE WITH IMPROVED OPTICAL PROPERTIES

(71) Applicant: Borealis AG, Vienna (AT)

(72) Inventors: Markus Gahleitner, Neunhofer/Krems (AT); Martina Sandholzer, Linz (AT); Klaus Bernreitner, Linz (AT)

(73) Assignee: Borealis AG (AT)

( * ) Notice: Subject to any disclaimer, the term of this patent is extended or adjusted under 35 U.S.C. 154(b) by 0 days.

(21) Appl. No.: 14/387,768

(22) PCT Filed: Mar. 25, 2013

(86) PCT No.: PCT/EP2013/056208
§ 371 (c)(1),
(2) Date: Sep. 24, 2014

(87) PCT Pub. No.: WO2013/144060
PCT Pub. Date: Oct. 3, 2013

(65) Prior Publication Data
US 2015/0050442 A1 Feb. 19, 2015

(30) Foreign Application Priority Data

Mar. 29, 2012 (EP) .................................... 12162007

(51) Int. Cl.
*C08L 23/16* (2006.01)
*C08J 5/18* (2006.01)
*C08L 23/14* (2006.01)

(52) U.S. Cl.
CPC .. *C08L 23/16* (2013.01); *C08J 5/18* (2013.01); *C08L 23/14* (2013.01); *C08J 2323/14* (2013.01); *Y10T 428/1397* (2015.01)

(58) Field of Classification Search
CPC ......... C08L 23/16; C08L 23/14; C08L 53/02; C08L 53/00; B32B 27/32; C08J 5/18; C08J 2323/14
USPC ........... 428/36.92, 200, 201, 219, 221, 315.5, 428/315.7, 317.3, 327, 336, 339, 341, 344, 428/34.2, 354, 355 AC, 355 EP, 36.1, 36.5, 428/36.8, 425.6, 425.8, 447, 461, 474.7, 428/500, 516, 518, 521, 64.1, 66.6; 525/95
See application file for complete search history.

(56) References Cited

U.S. PATENT DOCUMENTS

2011/0129627 A1* 6/2011 Schedenig et al. ........... 428/35.7

FOREIGN PATENT DOCUMENTS

| EP | 0738589 A2 | 10/1996 |
|---|---|---|
| EP | 1428854 A1 | 6/2004 |
| EP | 2022824 A1 | 2/2009 |
| WO | WO-2010015539 A1 | 2/2010 |

OTHER PUBLICATIONS

Grein, et al., Melt viscosity effects in ethylene-propylene copolymer, Rheol. Acta., 2007, 46: p. 1083-1089.*
Kromidas, Stavros, "Validierung in der Analytik", Wiley-VCH, Verlag GmbH, D-69469 Weinheim (Federal Republic of Germany) 1999.
Gottwald, Wolfgang, "Vorwort", Wiley-VCH, Verlag GmbH, D-69469 Weinheim (Bundesrepublik Deutschland) 1997.
First Japanese OA dated Apr. 8, 2015.

* cited by examiner

*Primary Examiner* — Gwendolyn Blackwell
*Assistant Examiner* — Kevin Ortman, Jr.
(74) *Attorney, Agent, or Firm* — Tarolli, Sundheim, Covell & Tummino LLP

(57) ABSTRACT

Polymer composition comprising a propylene copolymer and a styrenic based elastomer.

13 Claims, No Drawings

SOFT POLYPROPYLENE WITH IMPROVED OPTICAL PROPERTIES

The present invention relates to a polymer composition which is useful for the preparation of sterilizable containers such as retort pouches or medical packaging, for instance for intravenous solutions.

There is an increasing trend in the food packaging industry to use plastic containers, notably pouches containing sterilized or pre-cooked foods. Retort pouches offer many advantages over rigid metal packages such as faster cooking/sterilizing time, less shelf storage space, easier disposal, improved food taste, etc. Typical pouches have a multilayer structure with polyolefins such as polyethylene or polypropylene, adhesives, barrier and external layers. It is desired that the polyolefin material imparts stiffness as well as high impact strength to the final packaging material.

The same trend, i.e. increased use of polyolefinic materials, is seen in the medical packaging industry as well. Again, the polymer should impart sufficient stiffness as well as high impact strength to the final packaging material. In the case of medical applications, softness rather than stiffness is a key-requirement. Of course also these medical products must be sterilizable.

It is known that impact strength of polypropylene can be improved by dispersing a rubber phase within the polymer matrix, thereby obtaining a heterophasic polypropylene composition. Such a material is also called "impact-modified polypropylene".

As discussed above, it is known that heterophasic propylene polymers (impact-modified propylene polymers) provide high impact strength if the amount of rubber dispersed within the matrix is sufficiently high, e.g. in stand-up pouches typically at least 10 wt % or even at least 15 wt %.

As mentioned above, for some food packaging applications such as retort pouches or some medical packaging applications, a sterilization treatment is needed. The most common sterilization procedures are the use of heat (steam), radiation (beta radiation, electrons, or gamma radiation) or chemicals (usually ethylene oxide). Steam sterilisation is usually carried out in a temperature range of about 120 to 130° C. Of course, a treatment of a polymer under the sterilization conditions outlined above can impair its final properties.

However, it has turned out that standard heterophasic systems change significantly their properties after sterilization. Typically the optical properties as well as the mechanical properties are undesirable impaired.

Considering the drawbacks outlined above, it is an object of the present invention to provide a polymer composition which is soft, though and has good optical properties. Preferably these properties remain on a high level after sterilization treatment. A further object is that the properties of softness, toughness and good optical appearance are also observed at films made from the polymer composition before and after sterilization.

The finding of the present invention is that the polymer composition must comprise a heterophasic propylene copolymer and a styrenic based elastomer having rather low styrene content. Further the heterophasic propylene copolymer used must have a rather high comonomer content and xylene cold soluble (XCS) content, wherein the xylene cold soluble fraction is featured by high propylene content.

Accordingly, the present invention is directed to a polymer composition comprising
(a) a propylene copolymer (A) having
  (a1) a melt flow rate $MFR_2$ (230° C.) measured according to ISO 1133 in the range of more than 2.0 to 15.0 g/10 min,
  (a2) a comonomer content in the range of more than 7.5 to 16.5 wt.-%, and
  (a3) a xylene cold soluble content (XCS) determined according ISO 16152 (25° C.) in the range of 20.0 to 55.0 wt.-%,
  wherein
  (a4) the comonomer content of xylene cold soluble (XCS) fraction of the propylene copolymer is in the range of 14.0 to 30.0 wt.-%,
and
(b) styrenic based elastomer(s) (B) having a styrene content in the range of 5.0 to equal or below 15 wt.-%,
wherein further the weight ratio of propylene copolymer (A) and the styrenic based elastomer(s) (B) [(A)/(B)] is in the range of 9/1 to 3/2.

Preferably the styrenic based elastomer(s) (B) is(are) preferably a styrene-ethylene/butylene-styrene (SEBS) block copolymer (B-1) and/or a hydrogenated styrene-vinyl isoprene (SIS) block rubber (B-2).

Accordingly the present invention is preferably directed to a polymer composition comprising
(a) a propylene copolymer (A) having
  (a1) a melt flow rate $MFR_2$ (230° C.) measured according to ISO 1133 in the range of more than 2.0 to 15.0 g/10 min,
  (a2) a comonomer content in the range of more than 7.5 to 16.5 wt.-%, and
  (a3) a xylene cold soluble content (XCS) determined according ISO 16152 (25° C.) in the range of 20.0 to 55.0 wt.-%,
  wherein
  (a4) the comonomer content of xylene cold soluble (XCS) fraction of the propylene copolymer is in the range of 14.0 to 30.0 wt.-%,
and
(b) styrenic based elastomer(s) (B) being a styrene-ethylene/butylene-styrene (SEBS) block copolymer (B-1) and/or a hydrogenated styrene-vinyl isoprene (SIS) block rubber (B-2), wherein the styrene content in each styrenic based elastomer (B) is in the range of 5 to equal or below 15 wt.-%,
wherein further the weight ratio of propylene copolymer (A) and the styrenic based elastomer(s) (B) [(A)/(B)] is in the range of 9/1 to 3/2.

More preferably the polymer composition comprises as styrenic based elastomer(s) (B) only a styrene-ethylene/butylene-styrene (SEBS) block copolymer (B-1) and/or a hydrogenated styrene-vinyl isoprene (SIS) block rubber (B-2). Thus it is in particular appreciated that the polymer composition comprises as styrenic based elastomers (B) either a hydrogenated styrene-vinyl isoprene (SIS) block rubber (B-2) or a styrene-ethylene/butylene-styrene (SEBS) block copolymer (B-1), the latter especially preferred.

Further it is appreciated that the propylene copolymer (A) and the styrenic based elastomer(s) (B) are the only polymer components in the polymer composition.

Accordingly it is in particular preferred that the polymer composition according to this invention comprises as the only polymer components within the composition (i) the propylene copolymer (A) and
(ii) the styrene-ethylene/butylene-styrene (SEBS) block copolymer (B-1) and/or the hydrogenated styrene-vinyl isoprene (SIS) block rubber (B-2), preferably the styrene-ethylene/butylene-styrene (SEBS) block copolymer (B-1).

It has surprisingly been found that such polymer composition has a low flexural modulus, high penetration energy and good optical properties before and after sterilization.

In the following the present invention is described in more detail.

As stated above the inventive polymer composition is defined by the mixture of a propylene copolymer (A) and styrenic based elastomer(s) (B), i.e. preferably a styrene-ethylene/butylene-styrene (SEBS) block copolymer (B-1) and/or a hydrogenated styrene-vinyl isoprene (SIS) block rubber (B-2). In the following the two polymer components will be described separately.

The Propylene Copolymer (A)

The propylene copolymer (A) comprises apart from propylene also comonomers. Preferably the propylene copolymer (A) comprises apart from propylene ethylene and/or $C_4$ to $C_{12}$ α-olefins. Accordingly the term "propylene copolymer" according to this invention is understood as a polypropylene comprising, preferably consisting of, units derivable from
(a) propylene
and
(b) ethylene and/or $C_4$ to $C_{12}$ α-olefins.

Thus the propylene copolymer (A) according to this invention comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the propylene copolymer (A) according to this invention comprises, especially consists of, monomers copolymerizable with propylene from the group consisting of ethylene, 1-butene and 1-hexene. More specifically the propylene copolymer (A) of this invention comprises—apart from propylene—units derivable from ethylene and/or 1-butene. In a preferred embodiment the propylene copolymer (A) according to this invention comprises units derivable from ethylene and propylene only.

Additionally it is appreciated that the propylene copolymer (A) preferably has a rather high total comonomer content which contributes to the softness of the overall polymer composition. Thus it is required that the comonomer content of the propylene copolymer (A) is at least 7.5 wt.-%, preferably in the range of 7.5 to 16.5 wt.-%, more preferably in the range of equal or above 8.0 to 15.0 wt.-%, yet more preferably in the range of 8.0 to 13.0 wt.-%.

The propylene copolymer (A) of the instant invention can be further defined by the amount of comonomers within the xylene cold soluble (XCS) fraction. Accordingly it is preferred that the comonomer content in the xylene cold soluble fraction (XCS) of the propylene copolymer (A) is rather moderate. Thus it is appreciated that the comonomer content of the xylene cold soluble fraction (XCS) of the propylene copolymer (A) is in the range of 14.0 to 30.0 wt.-%, yet more preferably in the range of 15.0 to 28.0 wt.-%, still more preferably in the range of 16.0 to 24.0 wt.-%.

Concerning the comonomers present in the xylene cold soluble fraction (XCS) it is referred to the information provided for the propylene copolymer (A). Accordingly in a specific embodiment the xylene cold soluble fraction (XCS) comprises, especially consists of, monomers copolymerizable with propylene from the group consisting of ethylene, 1-butene and 1-hexene. More specifically the xylene cold soluble fraction (XCS) comprises—apart from propylene— units derivable from ethylene and/or 1-butene. In a preferred embodiment the xylene cold soluble fraction (XCS) comprises units derivable from ethylene and propylene only.

Considering the information provided above, it is preferred that the propylene copolymer (A) fulfills inequation (I), more preferably inequation (Ia), yet more preferably inequation (Ib), still more preferably inequation (Ic), $$0.30 \leq \frac{Co\ (total)}{Co\ (XCS)} \leq 0.75, \tag{I}$$

$$0.30 \leq \frac{Co\ (total)}{Co\ (XCS)} \leq 0.70, \tag{Ia}$$

$$0.35 \leq \frac{Co\ (total)}{Co\ (XCS)} \leq 0.65, \tag{Ib}$$

$$0.40 \leq \frac{Co\ (total)}{Co\ (XCS)} \leq 0.65, \tag{Ic}$$

wherein
Co (total) is the comonomer content [wt.-%] of the propylene copolymer (A)
Co (XCS) is the comonomer content [wt.-%] of the xylene cold soluble fraction (XCS) of the propylene copolymer (A).

In a further preferred embodiment the propylene copolymer (A) is additionally or alternatively defined by the rather overall comonomer content to its xylene cold soluble (XCS) fraction. Accordingly it is preferred that the propylene copolymer (A) fulfills inequation (II), more preferably inequation (IIa), yet more preferably inequation (IIb), $$\frac{Co\ (total)}{XCS} \leq 0.30 \tag{II}$$

$$0.20 \leq \frac{Co\ (total)}{XCS} \leq 0.30, \tag{IIa}$$

$$0.21 \leq \frac{Co\ (total)}{XCS} \leq 0.29, \tag{IIb}$$

wherein
Co (total) is the comonomer content [wt.-%] of the propylene copolymer (A),
XCS is the content of the xylene cold soluble fraction (XCS) [wt.-%] of the propylene copolymer (A).

Further it is appreciated that the xylene cold soluble (XCS) fraction the propylene copolymer (A) is specified by its intrinsic viscosity. A low intrinsic viscosity (IV) value reflects a low weight average molecular weight. For the present invention it is preferably required that the xylene cold soluble fraction (XCS) of propylene copolymer (A) has an intrinsic viscosity (IV) measured according to ISO 1628/1 (at 135° C. in decalin) of equal or above 1.5 dl/g, more preferably of in the range of 1.5 to below 3.0 dl/g, still more preferably in the range of 1.6 to 2.8 dl/g, like in the range of 1.6 to 2.5 dl/g.

Additionally it is appreciated that the propylene copolymer (A) has a xylene cold soluble fraction in the range of 20 to 55 wt.-%, more preferably in the range of 25 to 55 wt.-%, still yet more preferably in the range of 30 to 53 wt.-%. The remaining part of the propylene copolymer (A) being not soluble in cold xylene is the cold insoluble fraction (XCI) which is further defined below.

Accordingly it is preferred that the comonomer content in the cold insoluble fraction (XCI) of the propylene copolymer (A) is in the range of 1.5 to 6.0 wt.-%, yet more preferably in the range of 2.0 to 5.5 wt.-%, still more preferably in the range of 2.5 to 5.5 wt.-%.

Further it is preferred that the comonomer content in both fractions is in a specific ratio to each other. Accordingly it is preferred that the propylene copolymer (A) fulfills inequation (III) more preferably inequation (IIIa), yet more preferably inequation (IIIb), $$4.0 \leq \frac{Co\ (XCS)}{Co\ (XCI)} \leq 6.6 \quad \text{(III)}$$

$$4.0 \leq \frac{Co\ (XCS)}{Co\ (XCI)} \leq 6.3 \quad \text{(IIIa)}$$

$$4.2 \leq \frac{Co\ (XCS)}{Co\ (XCI)} \leq 6.0 \quad \text{(IIIb)}$$

wherein
Co (XCS) is the comonomer content [wt.-%] of the xylene cold soluble (XCS) of the propylene copolymer (A),
Co (XCI) is the comonomer content [wt.-%] of the xylene cold insoluble (XCI) of the propylene copolymer (A).

Preferably it is desired that the propylene copolymer (A) is thermo mechanically stable, so that for instance a thermal sterilization process can be accomplished. Accordingly it is appreciated that the propylene copolymer (A) has a melting temperature of at least 145° C., more preferably in the range of 144 to 160° C., still more preferably in the range of 145 to 159° C., like in the range of 146 to 153° C.

The propylene copolymer (A) according to this invention can have a melt flow rate $MFR_2$ (230° C.) in the range of 2.0 to 15.0 g/10 min, more preferably in the range of 2.5 to 12.0 g/10 min, more preferably in the range of 2.5 to 8.5 g/10 min, still more preferably in the range of 2.5 to 5.0 g/10 min. In case the propylene copolymer (A) is used as blown film material it has preferably a melt flow rate $MFR_2$ (230° C.) in the rage of 2.5 to 5.0 g/10 min, more preferably in the range of 3.0 to 4.5 g/10 min. In turn in case the propylene copolymer (A) is used for cast film or injection moulding it is preferred that the melt flow rate $MFR_2$ (230° C.) is in the range of 3.0 to 15.0 g/10 min, like in the range of 3.5 to 10.0 g/10 min.

As indicated above, the propylene copolymer (A) is featured by a rather high amount of a xylene cold soluble (XCS) fraction. On the other hand the propylene copolymer (A) is also preferably featured by a rather high amount of a crystalline fraction melting at high temperature. Accordingly the instant propylene copolymer (A) is a mixture of a crystalline polymer and amorphous material. Such type of polymer is classified as heterophasic propylene copolymer. A heterophasic propylene copolymer comprises a polymer matrix, like a (semi)crystalline polypropylene, in which the amorphous material, like an elastomeric propylene copolymer, is dispersed. Thus in a preferred embodiment the instant propylene copolymer (A) is heterophasic propylene copolymer (RAHECO). More precisely the instant propylene copolymer is heterophasic propylene copolymer (RAHECO) comprising a matrix (M) being a random propylene copolymer (R-PP) and dispersed therein an elastomeric propylene copolymer (E). Thus the matrix (M) contains (finely) dispersed inclusions being not part of the matrix (M) and said inclusions contain the elastomeric propylene copolymer (E). The term "inclusion" according to this invention shall preferably indicate that the matrix and the inclusion form different phases within the heterophasic propylene copolymer (RAHECO), said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Preferably the heterophasic propylene copolymer (RAHECO) according to this invention comprises as polymer components only the random propylene copolymer (R-PP) and the elastomeric propylene copolymer (E). In other words the heterophasic propylene copolymer (RAHECO) may contain further additives but no other polymer in an amount exceeding 5 wt.-%, more preferably exceeding 3 wt.-%, like exceeding 1 wt.-%, based on the total heterophasic propylene copolymer (RAHECO). One additional polymer which may be present in such low amounts is a polyethylene which is a by-reaction product obtained by the preparation of heterophasic propylene copolymer (RAHECO) (see in detail below). Accordingly it is in particular appreciated that the heterophasic propylene copolymer (RAHECO) contains only the random propylene copolymer (R-PP), the elastomeric propylene copolymer (E) and optionally polyethylene in amounts as mentioned in this paragraph.

Preferably the weight ratio between the matrix (M), i.e. the random propylene copolymer (R-PP), and the elastomeric propylene copolymer (E) is 50/50 to 90/10, more preferably 60/40 to 85/15, yet more preferably 70/30 to 85/15.

In the following the random propylene copolymer (R-PP) and the elastomeric propylene copolymer (E) are defined more precisely.

The random propylene copolymer (R-PP) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-PP) according to this invention comprises, especially consists of, monomers copolymerizable with propylene from the group consisting of ethylene, 1-butene and 1-hexene. More specifically the random propylene copolymer (R-PP) of this invention comprises—apart from propylene—units derivable from ethylene and/or 1-butene. In a preferred embodiment the random propylene copolymer (R-PP) comprises units derivable from ethylene and propylene only.

The comonomer content of the random propylene copolymer (R-PP) is preferably in the range of 3.0 to 12.5 wt.-%, yet more preferably in the range of 3.0 to 12.0 wt.-%, still more preferably in the range of 3.5 to 11.5 wt.-%.

Further it is appreciated that the propylene copolymer (A) fulfills inequation (IV), more preferably inequation (IVa), yet more preferably inequation (IVb), still more preferably inequation (IVc), $$\frac{Co\ (total)}{Co\ (RPP)} \geq 0.9, \quad \text{(IV)}$$

$$4.0 \geq \frac{Co\ (total)}{Co\ (RPP)} \geq 0.9, \quad \text{(IVa)}$$

$$3.0 \geq \frac{Co\ (total)}{Co\ (RPP)} \geq 0.9, \quad \text{(IVb)}$$

$$2.0 \geq \frac{Co\ (total)}{Co\ (RPP)} \geq 1.0, \quad \text{(IVc)}$$

wherein
Co (total) is the comonomer content [wt.-%] of the propylene copolymer (A), Co (RPP) is the comonomer content [wt.-%] of the random propylene copolymer (R-PP).

The term "random" indicates that the comonomers of the random propylene copolymer (R-PP), as well as of the first propylene copolymer fraction (R-PP1) and the second propylene copolymer fraction (R-PP2) are randomly distributed within the propylene copolymers. The term random is understood according to IUPAC (Glossary of basic terms in polymer science; IUPAC recommendations 1996).

The comonomer content of the matrix (M), i.e. of the random propylene copolymer (R-PP), has also impact on the amount of xylene cold solubles in the matrix (M). Thus it is preferred that the amount of the xylene cold soluble (XCS) fraction of the matrix (M), i.e. of the random propylene copolymer (R-PP), is preferably in the range of 5.0 to 50.0 wt.-%, still more preferably is in the range of 7.0 to 45.0 wt.-%.

The random propylene copolymer (R-PP) preferably comprises at least two polymer fractions, like two or three polymer fraction, all of them are propylene copolymers. Even more preferred the random propylene copolymer (R-PP) comprises, preferably consists of, a first propylene copolymer fraction (R-PP1) and a second propylene copolymer fraction (R—PP2). It is preferred that the first propylene copolymer fraction (R-PP1) is the comonomer lean fraction whereas the second propylene copolymer fraction (R-PP2) is the comonomer rich fraction.

Thus it is preferred that the first random propylene copolymer fraction (R-PP1) has a comonomer content of equal or below 5.0 wt.-%, more preferably of equal or below 4.0 wt.-%, yet more preferably in the range 0.5 to 5.0 wt.-%, still more preferably in the range 0.5 to 4.0 wt.-%.

As the comonomer of the first random propylene copolymer fraction (R-PP1) preferably is rather low, also its xylene cold soluble (XCS) is comparably low. Thus it is preferred that the amount of the xylene cold soluble (XCS) fraction of the first random propylene copolymer fraction (R-PP1) is equal or below than 12.0 wt.-%, more preferably is in the range of 1.0 to 10.0 wt.-%, still more preferably is in the range of 2.0 to 9.0 wt.-%, yet more preferably is in the range of 2.5 to 8.0 wt.-%, like in the range of 3.0 to 8.0 wt.-%. The xylene cold soluble (XCS) values provided in this paragraph are especially applicable before vis-breaking as mentioned in detail below.

On the other hand the second random propylene copolymer fraction (R-PP2) preferably has a comonomer content of at least 3.0 wt.-%, more preferably in the range 3.0 to 20.0 wt.-%, still more preferably in the range 4.0 to 19.0 wt.-%, yet more preferably in the range 5.0 to 18.0 wt.-%.

The comonomers of the first random propylene copolymer fraction (R-PP1) and second random propylene copolymer fraction (R-PP2), respectively, copolymerizable with propylene are ethylene and/or $C_4$ to $C_{12}$ α-olefins, in particular ethylene and/or $C_4$ to $C_8$ α-olefins, e.g. 1-butene and/or 1-hexene. Preferably the first random propylene copolymer fraction (R-PP1) and second random propylene copolymer fraction (R-PP2), respectively, comprise, especially consist of, monomers copolymerizable with propylene from the group consisting of ethylene, 1-butene and 1-hexene. More specifically the first random propylene copolymer fraction (R-PP1) and second random propylene copolymer fraction (R-PP2), respectively, comprise—apart from propylene— units derivable from ethylene and/or 1-butene. In a preferred embodiment the first random propylene copolymer fraction (R-PP1) and the second random propylene copolymer fraction (R-PP2) comprise the same comonomers, i.e. ethylene only.

Preferably the weight ratio between the first random propylene copolymer fraction (R-PP1) and the second random propylene copolymer fraction (R-PP2) is 20/80 to 80/20, more preferably 30/70 to 70/30, still more preferably 40/60 to 60/40.

As mentioned above a further component of the heterophasic propylene copolymer (RAHECO) is the elastomeric propylene copolymer (E) dispersed in the matrix (M), i.e. in the random propylene copolymer (R-PP). Concerning the comonomers used in the elastomeric propylene copolymer (E) it is referred to the information provided for the heterophasic propylene copolymer (RAHECO) and the random propylene copolymer (R-PP), respectively. Accordingly the elastomeric propylene copolymer (E) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the elastomeric propylene copolymer (E) comprises, especially consists of, monomers copolymerizable with propylene from the group consisting of ethylene, 1-butene and 1-hexene. More specifically the elastomeric propylene copolymer (E) comprises—apart from propylene—units derivable from ethylene and/or 1-butene. Thus in an especially preferred embodiment the elastomeric propylene copolymer (E) comprises units derivable from ethylene and propylene only. It is especially preferred that the random propylene copolymer (R-PP) and the elastomeric propylene copolymer (E) comprises the same comonomers. Accordingly in one specific embodiment the random propylene copolymer (R-PP) and the elastomeric propylene copolymer (E) comprise propylene and ethylene only.

The comonomer content of the elastomeric propylene copolymer (E) preferably is not more than 35.0 wt.-%, more preferably not more than 30.0 wt.-%, still more preferably in the range of 14.0 to 35.0 wt.-%, yet more preferably in the range of 15.0 to 30.0 wt.-%.

The instant propylene copolymer (A), i.e. the heterophasic propylene copolymer (RAHECO), is preferably obtained by a specific process. Accordingly the instant propylene copolymer (A), i.e. the heterophasic propylene copolymer (RAHECO), is preferably obtained by a sequential polymerization process comprising the steps of (a) polymerizing in a first reactor (R1)
   propylene and
   ethylene and/or a C4 to C12 α-olefin, preferably ethylene, obtaining a first polymer fraction, i.e. a first random propylene copolymer fraction (R-PP1), (b) transferring the first polymer fraction, i.e. the first random propylene copolymer fraction (R-PP1), into a second reactor (R2), (c) polymerizing in said second reactor (R2) in the presence of the first polymer fraction, i.e. of the first random propylene copolymer fraction (R-PP1), propylene and
   ethylene and/or a C4 to C12 α-olefin, preferably ethylene, obtaining a second polymer fraction, i.e. a second random propylene copolymer fraction (R-PP2), the first and second polymer fraction form a first mixture, i.e. the random propylene copolymer (R-PP), (d) transferring said first mixture, the random propylene copolymer (R-PP), into a third reactor (R3), (e) polymerizing in said third reactor (R3) in the presence of the first mixture, i.e. the random propylene copolymer (R-PP),
   propylene and
   ethylene and/or a C4 to C12 α-olefin, preferably ethylene, obtaining a third polymer fraction, said third polymer fraction is preferably the first fraction of the elastomeric propylene copolymer (E); the third polymer fraction and the first mixture, i.e. the random propylene copolymer (R-PP), form a second mixture, (f) transferring said second mixture into a fourth reactor (R4), (g) polymerizing in said forth reactor (R4) in the presence of the second mixture propylene and ethylene and/or a C4 to C12 α-olefin, preferably ethylene, obtaining a forth polymer fraction, said forth polymer fraction is preferably the second fraction of the elastomeric propylene copolymer (E); the forth polymer fraction and the second mixture form the propylene copolymer (A), i.e. the heterophasic propylene copolymer (RAHECO), (h) removing the propylene copolymer from the fourth reactor (R4), and (i) optionally visbreaking said propylene copolymer (A), i.e. said heterophasic propylene copolymer (RAHECO).

Preferably between the second reactor (R2), the third reactor (R3) and the fourth reactor (R4) the monomers are flashed out.

The term "sequential polymerization process" indicates that the propylene copolymer (A), i.e. the heterophasic propylene copolymer (RAHECO), is produced in at least four reactors, preferably in four reactors, connected in series. Accordingly the present process comprises at least a first reactor (R1), a second reactor (R2), a third reactor (R3), and a fourth reactor (R4). The term "polymerization reactor" shall indicate that the main polymerization takes place. Thus in case the process consists of four polymerization reactors, this definition does not exclude the option that the overall process comprises for instance a pre-polymerization step in a pre-polymerization reactor. The term "consist of" is only a closing formulation in view of the main polymerization reactors.

As stated above in the first two reactors the matrix (M), i.e. the random propylene copolymer (R-PP) is produced. More precisely, in the first reactor (R1) the first random propylene copolymer fraction (R-PP1) is produced whereas in the second reactor (R2) the second random propylene copolymer fraction (R-PP2).

The preferred comonomers used in the first reactor (R1) are the same as indicated above, for the first random propylene copolymer fraction (R-PP1). Accordingly especially preferred comonomers are ethylene, 1-butene and 1-hexene. In one specific embodiment the comonomer is ethylene.

Preferably the weight ratio between the first random propylene copolymer fraction (R-PP1) and the second random propylene copolymer fraction (R-PP2) is 20/80 to 80/20, more preferably 30/70 to 70/30, yet preferably 40/60 to 60/40.

Accordingly in the first reactor (R1) a first random propylene copolymer fraction (R-PP1) is produced having a comonomer content of equal or below 5.0 wt.-%, more preferably of equal or below 4.0 wt.-%, yet more preferably in the range 0.5 to 5.0 wt.-%, still more preferably in the range 0.5 to 4.0 wt.-%.

In the second rector (R2) the second random propylene copolymer fraction (R-PP2) is produced obtaining thereby the random propylene copolymer (R-PP).

The preferred comonomers used in the second reactor (R2) are the same as indicated above, for the first reactor (R1). Accordingly especially preferred comonomers are ethylene, 1-butene and 1-hexene. In one specific embodiment the comonomer is ethylene.

The second random propylene copolymer fraction (R-PP2) preferably has comonomer content of at least 3.0 wt.-%, more preferably in the range 3.0 to 20.0 wt.-%, still more preferably in the range 4.0 to 19.0 wt.-%, yet more preferably in the range 5.0 to 18.0 wt.-%.

Thus the overall comonomer content in the second reactor (R2), i.e. the comonomer content of the random propylene copolymer (R-PP), is preferably in the range of 3.0 to 12.5 wt.-%, yet more preferably in the range of 3.0 to 12.0 wt.-%, still more preferably in the range of 3.5 to 11.5 wt.-%.

The comonomers of the random propylene copolymer (R-PP), of the first random propylene copolymer fraction (R-PP1), and of the second random propylene copolymer fraction (R—PP2) copolymerizable with propylene are ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-PP), the first random propylene copolymer fraction (R-PP1), and the second random propylene copolymer fraction (R-PP2) comprise, especially consist of, monomers copolymerizable with propylene from the group consisting of ethylene, 1-butene and 1-hexene. More specifically the random propylene copolymer (R-PP), the first random propylene copolymer fraction (R-PP1) and the second random propylene copolymer fraction (R-PP2) comprise—apart from propylene—units derivable from ethylene and/or 1-butene. In a preferred embodiment the random propylene copolymer (R-PP), the first random propylene copolymer fraction (R-PP1) and the second random propylene copolymer fraction (R-PP2) comprise the same comonomers, i.e. ethylene only.

Further the first random propylene copolymer fraction (R-PP1), i.e. the polymer of the first reactor (R1), has preferably a xylene cold soluble (XCS) fraction of equal or below than 12.0 wt.-%, more preferably in the range of 1.0 to 10.0 wt.-%, still more preferably in the range of 2.0 to 9.0 wt.-%, yet more preferably in the range of 2.5 to 8.0 wt.-%, still yet more preferably in the range of 3.0 to 8.0 wt.-%.

On the other hand the second random propylene copolymer fraction (R-PP2), i.e. the polymer produced in the second reactor (R2), preferably has a xylene cold soluble (XCS) fraction of below 80 wt.-%, more preferably in the range of 10 to 80 wt.-%, yet more preferably in the range of 15 to 70 wt.-%.

Accordingly the overall xylene cold soluble (XCS) content in the second reactor, i.e. the xylene cold soluble (XCS) fraction of the random propylene copolymer (R-PP), is preferably in the range of 5.0 to 50.0 wt.-%, still more preferably is in the range of 7.0 to 45.0 wt.-%.

Preferably the first random propylene copolymer fraction (R-PP1) preferably has a melt flow rate $MFR_2$ (230° C.) in the range of in the range of 0.5 to 3.0 g/10 min, more preferably in the range 1.0 to 3.0 g/10 min.

On the other hand the second random propylene copolymer fraction (R-PP2), i.e. the polymer produced in the second reactor (R2), preferably has a melt flow rate $MFR_2$ (230° C.) in the range of 0.1 to 3.0 g/10 min, more preferably in the range of 0.1 to 2.5 g/10 min.

Accordingly the overall melt flow rate $MFR_2$ (230° C.) in the second reactor, i.e. the melt flow rate $MFR_2$ (230° C.) of the random propylene copolymer (R-PP), preferably is in the range of 0.2 to 3.0 g/10 min, more preferably in the range 0.5 to 3.0 g/10 min.

Thus after the second reactor (R2) the matrix (M), i.e. the random propylene copolymer (R—PP), of the propylene copolymer, i.e. the heterophasic propylene copolymer (RAHECO), is obtained. This matrix (M) is subsequently transferred into the third reactor (R3) in which the first fraction of the elastomeric propylene copolymer (E) is produced (step (e)).

The preferred comonomers used in the third reactor (R3) are the same as indicated above, for the first reactor (R1).

Accordingly especially preferred comonomers are ethylene, 1-butene and 1-hexene. In one specific embodiment the comonomer is ethylene.

The obtained second mixture comprises the matrix (M) in which the first fraction of the elastomeric propylene copolymer (E) is dispersed. Said second mixture has preferably a comonomer content which is higher than the comonomer content of the second reactor (R2).

On the other hand the comonomer content should be not too high. Thus it is preferred that the comonomer content of the second mixture, i.e. after step (e)), is not more than 30.0 wt.-%, preferably in the range of 5.0 to 28.0 wt.-%, more preferably in the range of 6.0 to 25.0 wt.-%.

Another characteristic feature of the second mixture is its xylene cold soluble (XCS) content. Accordingly it is appreciated that the second mixture has xylene cold soluble (XCS) fraction of not more than 55 wt.-%, more preferably of not more than 50 wt.-%, still more preferably in the range of 20 to 55 wt.-%, yet more preferably in the range of 25 to 50 wt.-%.

The comonomer content in the xylene cold soluble fraction (XCS) of the second mixture preferably is at least 14.0 wt.-%, more preferably in the range of 14.0 to 28.0 wt.-%, yet more preferably in the range of 15.0 to 26.0 wt.-%, still more preferably in the range of 16.0 to 25.0 wt.-%.

In step (f) the second mixture is transferred into the fourth reactor (R4). In the fourth reactor (R4) the second fraction of the elastomeric propylene copolymer (E) is produced (step (g)).

The preferred comonomers used in the fourth reactor (R4) are the same as indicated above for the first reactor (R1). Accordingly especially preferred comonomers are ethylene, 1-butene and 1-hexene. In one specific embodiment the comonomer is ethylene.

The so obtained polymer is the propylene copolymer (A), i.e. the heterophasic propylene copolymer (RAHECO), of the instant invention.

Preferably the propylene copolymer (A), i.e. the heterophasic propylene copolymer (RAHECO), after step (g) has a melt flow rate $MFR_2$ (230° C.) in the range of 0.5 to 2.0 g/10 min, like 0.5 to 1.9 g/10 min.

It is preferred that the comonomer content of the xylene cold soluble fraction (XCS) after step (g), i.e. the comonomer content of the xylene cold soluble fraction (XCS) of the propylene copolymer (A), i.e. of the heterophasic propylene copolymer (RAHECO), is in the range of 14.0 to 30.0 wt.-%, yet more preferably in the range of 15.0 to 28.0 wt.-%, still more preferably in the range of 16.0 to 24.0 wt.-%.

Further the propylene copolymer (A), i.e. the heterophasic propylene copolymer (RAHECO), preferably has xylene cold soluble (XCS) fraction of at least 20 wt.-%, more preferably in the range of 20 to 55 wt.-%, yet more preferably in the range of 25 to 55 wt.-%, still yet more preferably in the range 30 to 53 wt.-%.

In another preferred embodiment the intrinsic viscosity (IV) measured according to ISO 1628/1 (at 135° C. in decalin) of the xylene cold soluble fraction (XCS) of propylene copolymer after step (g) preferably is of equal or below 3.0 dl/g, more preferably in the range of 1.5 to below 3.0 dl/g, still more preferably in the range of 1.6 to below 2.8 dl/g.

Concerning the melting temperature of the propylene copolymer (A), i.e. of the heterophasic propylene copolymer (RAHECO), after step (g) it is referred to the information provide above.

Preferably the weight ratio between the matrix (M), i.e. the random propylene copolymer (R—PP), after step (c) and the elastomeric propylene copolymer (E) produced in the steps (e) to (g) is 50/50 to 90/10, more preferably 60/40 to 85/15, yet more preferably 70/30 to 85/15.

After step (g) the propylene copolymer (A), i.e. the heterophasic propylene copolymer (RAHECO), can be optionally subjected a visbreaking step (step (i)) obtaining thereby a propylene copolymer (A), i.e. a heterophasic propylene copolymer (RAHECO), with enhanced melt flow rate. The visbreaking may be carried out in any known manner, but typically the present invention envisages chemical visbreaking using a peroxide visbreaking agent. Typical visbreaking agents are 2,5-dimethyl-2,5-bis(tert.butyl-peroxy)hexane (DHBP) (for instance sold under the tradenames Luperox 101 and Trigonox 101), 2,5-dimethyl-2,5-bis(tert.butyl-peroxy)hexyne-3 (DYBP) (for instance sold under the tradenames Luperox 130 and Trigonox 145), dicumyl-peroxide (DCUP) (for instance sold under the tradenames Luperox DC and Perkadox BC), di-tert.butyl-peroxide (DTBP) (for instance sold under the tradenames Trigonox B and Luperox Di), tert.butyl-cumyl-peroxide (BCUP) (for instance sold under the tradenames Trigonox T and Luperox 801) and bis(tert.butylperoxy-isopropyl)benzene (DIPP) (for instance sold under the tradenames Perkadox 14S and Lupperox DC). Suitable amounts of peroxide to be employed in accordance with the present invention are in principle known to the skilled person and can easily be calculated on the basis of the amount of propylene copolymer (A) of step (g) to be subjected to visbreaking, the $MFR_2$ (230° C.) value of the propylene copolymer (A) of step (g) to be subjected to visbreaking and the desired target $MFR_2$ (230° C.) of the product to be obtained. Accordingly, typical amounts of peroxide visbreaking agent are from 0.005 to 0.5 wt.-%, more preferably from 0.005 to 0.2 wt.-%, based on the amount of propylene copolymer employed.

Typically, visbreaking in accordance with the present invention is carried out in an extruder, so that under the suitable conditions, an increase of melt flow rate is obtained. During visbreaking, higher molar mass chains of the starting product are broken statistically more frequently than lower molar mass molecules, resulting in an overall decrease of the average molecular weight and an increase in melt flow rate.

Due to the visbreaking the melt flow rate, the amount of xylene cold solubles (XCS) and the intrinsic viscosity (IV) of the xylene cold soluble (XCS) fraction of the propylene copolymer (A), i.e. of the heterophasic propylene copolymer (RAHECO), might be affected. On the other hand the melting temperature, the total comonomer content and the comonomer content of the xylene cold soluble (XCS) fraction of the propylene copolymer (A), i.e. of the heterophasic propylene copolymer (RAHECO), are not affected. Thus the non-visbroken propylene copolymer (A) (after step (g)) and the visbroken propylene copolymer (A) (after step (i)) have the same melting temperature, the same total comonomer content and the same comonomer content of the xylene cold soluble (XCS) fraction. Thus with regard to these embodiments reference is made to the information provided above.

On the other hand, the visbroken propylene copolymer (A) after step (i) may differ in the melt flow rate, the xylene cold soluble fraction (XCS) and the intrinsic viscosity (IV) from the non visbroken propylene copolymer (A) after step (g). Accordingly the propylene copolymer (A) after step (i) preferably has a melt flow rate $MFR_2$ (230° C.) in the range of 2.0 to 15.0 g/10 min, more preferably in the range of 2.5 to 12.0 g/10 min, yet more preferably in the range of 2.5 to 8.5 g/10 min, like in the range of 2.5 to 5.0 g/10 min.

Further it is preferred that the xylene cold soluble fraction (XCS) of propylene copolymer (A) after step (i) is in the range of 20 to 55 wt.-%, yet more preferably in the range of 25 to 55 wt.-%, still more preferably in the range of 30 to 53 wt.-%.

Preferably the xylene cold soluble fraction (XCS) of propylene copolymer (A) after step (i) has an intrinsic viscosity (IV) measured according to ISO 1628/1 (at 135° C. in decalin) of equal or above 1.5 dl/g, more preferably of in the range of 1.5 to equal or below 3.0 dl/g, still more preferably in the range of 1.6 to 2.8 dl/g, yet more preferably in the range of 1.6 to 2.5 dl/g.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2), the third reactor (R3), and the fourth reactor (R4) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like loop reactor (LR), whereas the second reactor (R2), third reactor (R3) and the fourth reactor (R4) are gas phase reactors (GPR). Accordingly for the instant process at least four, preferably four polymerization reactors, namely a slurry reactor (SR), like loop reactor (LR), a first gas phase reactor (GPR-1), a second gas phase reactor (GPR-2) and a third gas phase reactor (GPR-3) connected in series are used. If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the propylene copolymer (A), i.e. the heterophasic propylene copolymer (RAHECO), as defined above the conditions for the first reactor (R1), i.e. the slurry reactor (SR), like a loop reactor (LR), of step (a) may be as follows:

the temperature is within the range of 40° C. to 110° C., preferably between 60° C. and 100° C., like 68 to 90° C.,
the pressure is within the range of 20 bar to 80 bar, preferably between 40 bar to 70 bar,
hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:

the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

The condition in the third reactor (R3), preferably in the second gas phase reactor (GPR-2), and the fourth reactor (R4), preferably in the third gas phase reactor (GPR-3), are similar to the second reactor (R2).

The residence time can vary in the three reactor zones.

In one embodiment of the process for producing the propylene copolymer (A), i.e. the heterophasic propylene copolymer (RAHECO), the residence time the first reactor (R1), i.e. the slurry reactor (SR), like a loop reactor (LR), is in the range 0.2 to 4 hours, e.g. 0.3 to 1.5 hours and the residence time in the gas phase reactors will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 0 to 50° C., preferably from 10 to 45° C., and more preferably from 15 to 40° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the propylene copolymer (A), i.e. the heterophasic propylene copolymer (RAHECO), is obtained by a sequential polymerization process, as described above, in the presence of a catalyst system comprising a Ziegler-Natta catalyst and optionally an external donor, preferably a catalyst system comprising three components, namely as component (i) a Ziegler-Natta procatalyst, and optionally as component (ii) an organometallic cocatalyst and as component (iii) an external donor represented by formula (IIIa) or (Iamb), preferably represented by formula (IIIa).

The process runs especially efficient by using a Ziegler-Natta catalyst system, preferably by using a Ziegler-Natta catalyst system as defined herein detail below, and a specific comonomer/propylene ratio in the second reactor (R2) and/or in the third (R3) and forth reactor (R4), respectively. Accordingly it is preferred that (a) the comonomer/propylene ratio [Co/C3], like the ethylene/propylene ratio [C2/C3], in the second reactor (R2), i.e. in step (c), is in the range of 30 to 220 mol/kmol, more preferably in the range of 40 to 210 mol/kmol, and/or (b) the comonomer/propylene ratio [Co/C3], like the ethylene/propylene ratio [C2/C3], in the third reactor (R3), i.e. in step (e), is in the range of 120 to 320 mol/kmol, more preferably in the range of 130 to 310 mol/kmol, and/or (c) the comonomer/propylene ratio [Co/C3], like the ethylene/propylene ratio [C2/C3], in the fourth reactor (R4), i.e. in step (g), is in the range of 120 to 320 mol/kmol, more preferably in the range of 130 to 310 mol/kmol.

In the following the used catalyst is defined in more detail.

The procatalyst used according to the invention is prepared by a) reacting a spray crystallized or emulsion solidified adduct of $MgCl_2$ and a $C_1$-$C_2$ alcohol with $TiCl_4$ b) reacting the product of stage a) with a dialkylphthalate of formula (I)

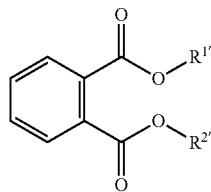
(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor c) washing the product of stage b) or d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2$*nROH, wherein R is methyl or ethyl, preferably ethyl, and n is 1 to 6, is contacting with $TiCl_4$ to form a titanised carrier, followed by the steps of adding to said titanised carrier (i) a dialkylphthalate of formula (I) with $R^{1'}$ and $R^{2'}$ being independently at least a $C_5$-alkyl, like at least a $C_8$-alkyl, or preferably (ii) a dialkylphthalate of formula (I) with $R^{1'}$ and $R^{2'}$ being the same and being at least a $C_5$-alkyl, like at least a $C_8$-alkyl, or more preferably (iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate, to form a first product, subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

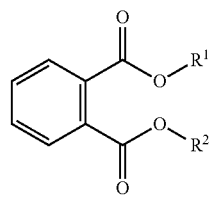
(II)

with $R^1$ and $R^2$ being methyl or ethyl, preferably ethyl, the dialkylphthalat of formula (II) being the internal donor and recovering said transesterification product as the procatalyst composition (component (i)).

The adduct of the formula $MgCl_2$*nROH, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the catalyst as described in the example section; especially with the use of dioctylphthalate as dialkylphthalate of formula (I).

For the production of the propylene copolymer (A), i.e. the heterophasic propylene copolymer (RAHECO), according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (IIIb). Formula (IIIa) is defined by $$Si(OCH_3)_2R_2^5 \qquad (IIIa)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by $$Si(OCH_2CH_3)_3(NR^xR^y) \quad \text{(IIIb)}$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor of formula (IIIb) is diethylaminotriethoxysilane.

More preferably the external donor is selected from the group consisting of diethylaminotriethoxysilane [Si (OCH$_2$CH$_3$)$_3$(N(CH$_2$CH$_3$)$_2$)], dicyclopentyl dimethoxy silane [Si(OCH$_3$)$_2$(cyclo-pentyl)$_2$], diisopropyl dimethoxy silane [Si(OCH$_3$)$_2$(CH(CH$_3$)$_2$)$_2$] and mixtures thereof. Most preferably the external donor is dicyclopentyl dimethoxy silane [Si(OCH$_3$)$_2$(cyclo-pentyl)$_2$].

If desired the Ziegler-Natta procatalyst is modified by polymerizing a vinyl compound in the presence of the catalyst system, comprising the special Ziegler-Natta procatalyst (component (i)), the external donor (component (iii)) and optionally the cocatalyst (component (ii)), wherein the vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms. The so modified catalyst is used for the preparation of the propylene copolymer (A), i.e. of the heterophasic propylene copolymer (RAHECO), to accomplish α-nucleation of the propylene copolymer (A) i.e. of the heterophasic propylene copolymer (RAHECO) (BNT-technolgy).

The propylene copolymer (A), i.e. the heterophasic propylene copolymer (RAHECO), can be additivated prior to mixing it with the styrenic based elastomers(s) (B). In such as case the additives are added prior or after visbreaking to the propylene copolymer (A), i.e. to the heterophasic propylene copolymer (RAHECO). Typical additives are nucleating agents, antioxidants, as well as slip agents and antiblocking agents. Preferably the additive content is below 5.0 wt.-%, preferably below 3.0 wt.-%, like below 1.0 wt.-%.

The Styrenic Based Elastomers(s) (B)

The additional required component in the present invention is a styrenic thermoplastic elastomer. This additional component may be dispersed in the propylene copolymer (A), i.e. in the heterophasic propylene copolymer (RAHECO). It has been discovered that not any styrenic thermoplastic elastomer is suitable for the present invention but only a specific class of such elastomers. Accordingly for the present invention (a) styrenic based elastomer(s) (B) with a rather low styrene content, i.e. being in the range of 5 to equal or below 15 wt.-%, must be used.

Preferably the styrenic based elastomer(s) (B) can be a styrene-ethylene/butylene-styrene (SEBS) block copolymer (B-1) and/or a hydrogenated styrene-vinyl isoprene (SIS) block rubber (B-2).

Accordingly it is appreciated that the styrenic based elastomer(s) (B), preferably the styrene-ethylene/butylene-styrene (SEBS) block copolymer (B-1) and/or the hydrogenated styrene-vinyl isoprene (SIS) block rubber (B-2), has (have) a styrene content of equal or below 15 wt.-%, more preferably of equal or below 14 wt.-%, yet more preferably of equal or below 13 wt.-%. On the other hand the styrene content in the styrenic based elastomer(s) (B), preferably in the styrene-ethylene/butylene-styrene (SEBS) block copolymer (B-1) and/or in the hydrogenated styrene-vinyl isoprene (SIS) block rubber (B-2), shall not fall below 5 wt.-%. Thus a preferred range is of 5 to 15 wt.-%, more preferred of 10 to 15 wt.-% and yet more preferred of 11 to 14 wt.-%.

Further it is appreciated that the styrenic based elastomer(s) (B), preferably the styrene-ethylene/butylene-styrene (SEBS) block copolymer (B-1) and/or the hydrogenated styrene-vinyl isoprene (SIS) block rubber (B-2), has (have) a moderate melt flow rate $MFR_2$ (230° C.), i.e. not more than 20.0 g/10 min, more preferably not more than 10.0 g/10 min, still more preferably not more than 6.0 g/10 min. On the other hand the melt flow rate of the styrenic based elastomer(s) (B), preferably the styrene-ethylene/butylene-styrene (SEBS) block copolymer (B-1) and/or the hydrogenated styrene-vinyl isoprene (SIS) block rubber (B-2), shall not fall below 1.0 g/10 min. Accordingly, a preferred range is of 1.0 to 20.0 g/10 min, more preferred of 2.0 to 10.0 g/10 min.

Further the styrenic based elastomer(s) (B), preferably the styrene-ethylene/butylene-styrene (SEBS) block copolymer (B-1) and/or the hydrogenated styrene-vinyl isoprene (SIS) block rubber (B-2), may be defined by its density. Thus it is appreciated that the styrenic based elastomer (B), preferably the styrene-ethylene/butylene-styrene (SEBS) block copolymer (B-1) and/or the hydrogenated styrene-vinyl isoprene (SIS) block rubber (B-2), has (have) a density of equal or below 0.905 g/cm$^3$, more preferred in the range of 0.850 to 0.905 g/cm$^3$.

Additionally or alternatively the styrenic based elastomer (B), preferably the styrene-ethylene/butylene-styrene (SEBS) block copolymer (B-1) and/or the hydrogenated styrene-vinyl isoprene (SIS) block rubber (B-2), can be defined by the Shore A hardness. Thus it is appreciated that the styrenic based elastomer (B), preferably the styrene-ethylene/butylene-styrene (SEBS) block copolymer (B-1) and/or the hydrogenated styrene-vinyl isoprene (SIS) block rubber (B-2), has/have a Shore A hardness measured according to ASTM D 2240 from 25 to 70, preferably from 30 to 60.

Polymer Composition

Especially good results are achievable in case the propylene copolymer (A), i.e. the heterophasic propylene copolymer (RAHECO), and the styrenic based elastomer(s) (B) are present in a specific amount. Accordingly it is appreciated that the weight ratio between the propylene copolymer (A), i.e. the heterophasic propylene copolymer (RAHECO), and the styrenic based elastomer(s) (B) [(A)/(B)] is in the range of 9/1 to 3/2, preferably in the range of 22/3 to 13/7, more preferably in the range of 4/1 to 14/6.

Thus it is preferred that the instant polymer composition comprises from 10 to 40 wt.-%, more preferably from 12 to 35 wt.-%, still more preferably from 20 to 30 wt.-%, of the styrenic based elastomer(s) (B). The weight percentages given in this paragraph are based on the total amount of the polymer composition, preferably based on the total amount of polymers present in the invention, more preferably based on the amount of the propylene copolymer (A), i.e. the heterophasic propylene copolymer, and the styrenic based elastomer(s) (B) together. Accordingly in one specific embodiment the polymer composition comprises (a) 60 to 90 wt.-%, preferably 65 to 88 wt.-%, more preferably 70 to 80 wt.-%, of the propylene copolymer (A), i.e. the heterophasic propylene copolymer (RAHECO), and (b) 10 to 40 wt.-%, preferably from 12 to 35 wt.-%, more preferably from 20 to 30 wt.-%, of the styrenic based elastomer(s) (B), based on the total amount of polymers present in the invention, more preferably based on the amount of the propylene copolymer (A), i.e. the heterophasic propylene copolymer, and the styrenic based elastomer(s) (B) together.

Therefore in one specific embodiment the polymer composition comprises as polymer components only the propylene copolymer (A), i.e. the heterophasic propylene copolymer (RAHECO), and the styrenic based elastomer(s) (B), preferably the styrene-ethylene/butylene-styrene (SEBS) block copolymer (B-1). In other words the polymer composition may comprise additives but no further polymers other than propylene copolymer (A) and the styrenic based elastomer(s) (B).

Typical additives are those mentioned above in the section propylene copolymer (A). The total amount of additives shall be not more than 10.0 wt.-%, preferably not more than 8.0 wt.-%, more preferably not more than 5.0 wt.-%, yet more preferably not more than 4.0 wt.-%, still more preferably not more than 3.0 wt.-%, in the total polymer composition.

Thus it is appreciated that the propylene copolymer (A), i.e. the heterophasic propylene copolymer (RAHECO), and styrenic based elastomer(s) (B), preferably the styrene-ethylene/butylene-styrene (SEBS) block copolymer (B-1) and/or the hydrogenated styrene-vinyl isoprene (SIS) block rubber (B-2), together constitute at least 60.0 wt.-%, more preferably at least 70.0 wt.-%, yet more preferably at least 80.0 wt.-%, still more preferably 90.0 wt.-%, e.g. 92.0 wt.-%, yet still more preferably 95.0 wt.-%, like 97.0 wt.-%, of the inventive polymer composition.

It has been further discovered that the properties can be further enhanced in case both main components, i.e. the propylene copolymer (A), preferably the heterophasic propylene copolymer (RAHECO), and styrenic based elastomer(s) (B), preferably the styrene-ethylene/butylene-styrene (SEBS) block copolymer (B-1) and/or the hydrogenated styrene-vinyl isoprene (SIS) block rubber (B-2), have concerted melt flow rates. Accordingly it is appreciated that the $MFR_2$ (230° C.) ratio of the heterophasic propylene copolymer (A) and styrenic based elastomer (B), preferably the styrene-ethylene/butylene-styrene (SEBS) block copolymer (B-1) and/or the hydrogenated styrene-vinyl isoprene (SIS) block rubber (B-2), ($MFR_{(A)}/MFR_{(B)}$) is equal or above 1.0. On the other hand the differences in the viscosity should be not too high. Thus a preferred the $MFR_{(A)}/MFR_{(B)}$ ratio is of 1.0 to 3.0.

It is further appreciated that the instant polymer composition has a melt flow rate $MFR_2$ (230° C.) in the range of 2.5 to 15.0 g/10 min, more preferably in the range of 2.5 to 12.0 g/10 min, more preferably in the range of 2.5 to 8.5 g/10 min, still more preferably in the range of 2.5 to 5.0 g/10 min. In case the polymer composition is used as blown film material it has preferably a melt flow rate $MFR_2$ (230° C.) in the rage of 2.5 to 5.0 g/10 min, more preferably in the range of 3.0 to 4.5 g/10 min. In turn in case the polymer composition is used for cast film or injection moulding it is preferred that the melt flow rate $MFR_2$ (230° C.) is in the range of 3.0 to 15.0 g/10 min, like in the range of 3.5 to 10.0 g/10 min.

Preferably the polymer composition has a flexural modulus measured according to ISO 178 of not more than 200 MPa, more preferably in the range of 70 to 200 MPa, still more preferably in the range of 80 to 150 MPa.

Additionally and/or alternatively the polymer composition preferably has (a) a haze before sterilization determined according to ASTM D 1003-07 (60×60×1 $mm^3$ injection moulded plaques) of below 25%, more preferably 5 to 25%, yet more preferably 7 to below 20%, and/or (b) a haze after sterilization determined according to ASTM D 1003-07 (60×60×1 $mm^3$ injection moulded plaques) of below 55%, more preferably 10 to below 50%, yet more preferably 15 to 45%, and/or (c) a haze before sterilization determined according to ASTM D1003-00 (50 µm cast film) below 15%, more preferably 1 to below 15%, yet more preferably 2 to 12%, and/or (d) a haze after sterilization determined according to ASTM D 1003-00 (50 µm cast film) of below 40%, more preferably 8 to below 40%, yet more preferably 10 to 35%.

Applications

The present invention is also directed to the use of the polymer composition as defined in the instant invention for the preparation of films, in particular sterilisable or sterilised films, and/or injection moulded articles, like containers, i.e. pouches, especially sterilisable or sterilised injection moulded articles, like containers, i.e. pouches.

Further the present invention is directed to a film, in particular to a sterilisable or sterilised film, comprising the polymer composition as defined in the instant invention. More preferably the polymer composition is the only polymer component in the film. Further the present invention is directed to an injection moulded article, like container, i.e. pouch, especially to a sterilisable or sterilised injection moulded article, like container, i.e. pouch, comprising the polymer composition as defined in herein. The container is in particular a pouch. Further said container, i.e. pouch, has been preferably subjected to a sterilisation treatment.

In the following the present invention is further illustrated by means of examples.

EXAMPLES

1. Measuring Methods

The following definitions of terms and determination methods apply for the above general description of the invention as well as to the below examples unless otherwise defined. Calculation of comonomer content of the second propylene copolymer fraction (R-PP2):

$$\frac{C(PP) - w(PP1) \times C(PP1)}{w(PP2)} = C(PP2) \quad (I)$$

wherein w(PP1) is the weight fraction [in wt.-%] of the first propylene copolymer fraction (R-PP1), w(PP2) is the weight fraction [in wt.-%] of second propylene copolymer fraction (R-PP2), C(PP1) is the comonomer content [in wt.-%] of the first propylene copolymer fraction (R-PP1),
C(PP) is the comonomer content [in wt.-%] of the random propylene copolymer (R-PP),
C(PP2) is the calculated comonomer content [in wt.-%] of the second propylene copolymer fraction (R-PP2).

Calculation of the xylene cold soluble (XCS) content of the second propylene copolymer fraction (R-PP2):

$$\frac{XS(PP) - w(PP1) \times XS(PP1)}{w(PP2)} = XS(PP2) \quad \text{(II)}$$

wherein
w(PP1) is the weight fraction [in wt.-%] of the first propylene copolymer fraction (R-PP1),
w(PP2) is the weight fraction [in wt.-%] of second propylene copolymer fraction (R-PP2),
XS(PP1) is the xylene cold soluble (XCS) content [in wt.-%] of the first propylene copolymer fraction (R-PP1),
XS(PP) is the xylene cold soluble (XCS) content [in wt.-%] of the random propylene copolymer (R-PP),
XS(PP2) is the calculated xylene cold soluble (XCS) content [in wt.-%] of the second propylene copolymer fraction (R-PP2), respectively.

Calculation of melt flow rate MFR$_2$ (230° C.) of the second propylene copolymer fraction (R-PP2):

$$MFR(PP2) = 10\left[\frac{\log(MFR(PP)) - w(PP1) \times \log(MFR(PP1))}{w(PP2)}\right] \quad \text{(III)}$$

wherein
w(PP1) is the weight fraction [in wt.-%] of the first propylene copolymer fraction (R-PP1),
w(PP2) is the weight fraction [in wt.-%] of second propylene copolymer fraction (R-PP2),
MFR(PP1) is the melt flow rate MFR$_2$ (230° C.) [in g/10 min] of the first propylene copolymer fraction (R-PP1),
MFR(PP) is the melt flow rate MFR$_2$ (230° C.) [in g/10 min] of the random propylene copolymer (R-PP),
MFR(PP2) is the calculated melt flow rate MFR$_2$ (230° C.) [in g/10 min] of the second propylene copolymer fraction (R-PP2).

Calculation of comonomer content of the elastomeric propylene copolymer (E), respectively:

$$\frac{C(RAHECO) - w(PP) \times C(PP)}{w(E)} = C(E) \quad \text{(IV)}$$

wherein
w(PP) is the weight fraction [in wt.-%] of the random propylene copolymer (R-PP), i.e. polymer produced in the first and second reactor (R1+R2),
w(E) is the weight fraction [in wt.-%] of the elastomeric propylene copolymer (E), i.e. polymer produced in the third and fourth reactor (R3+R4)
C(PP) is the comonomer content [in wt.-%] of the random propylene copolymer (R-PP), i.e. comonomer content [in wt.-%] of the polymer produced in the first and second reactor (R1+R2),
C(RAHECO) is the comonomer content [in wt.-%] of the propylene copolymer, i.e. is the comonomer content [in wt.-%] of the polymer obtained after polymerization in the fourth reactor (R4),
C(E) is the calculated comonomer content [in wt.-%] of elastomeric propylene copolymer (E), i.e. of the polymer produced in the third and fourth reactor (R3+R$_4$).

MFR$_2$ (230° C.) is measured according to ISO 1133 (230° C., 2.16 kg load).

Comonomer content, especially ethylene content is measured with Fourier transform infrared spectroscopy (FTIR) calibrated with $^{13}$C-NMR. When measuring the ethylene content in polypropylene, a thin film of the sample (thickness about 250 µm) was prepared by hot-pressing. The area of absorption peaks 720 and 733 cm$^{-1}$ for propylene-ethylene-copolymers was measured with Perkin Elmer FTIR 1600 spectrometer. Propylene-1-butene-copolymers were evaluated at 767 cm$^{-1}$. The method was calibrated by ethylene content data measured by $^{13}$C-NMR. See also "IR-Spektroskopie für Anwender"; WILEY-VCH, 1997 and "Validierung in der Analytik", WILEY-VCH, 1997.

Styrene Content

The styrene content is measured by Fourier transform infrared spectroscopy (FTIR). A thin film of 300 µm thickness is prepared from pelletized material by hot-pressing (190° C., 100 bar, 1 minute). Per sample, two films are prepared. The so prepared film-samples are measured by a Perkin Elmer IR-Spectrophotometer System 2000FTIR. The peak at 1602 cm$^{-1}$ (Phenyl-Absorption) is integrated and evaluated by using an internally established calibration curve. The arithmetic mean of two measurements is given as result.

Calibration: Various polypropylene-compounds consisting of PP and a styrene-containing elastomer (of known styrene-content) are prepared and measured according to the method described above.

Intrinsic viscosity is measured according to DIN ISO 1628/1, October 1999 (in Decalin at 135° C.).

The Xylene Solubles (XCS, wt.-%):
Content of xylene cold solubles (XCS) is determined at 25° C. according ISO 16152; first edition; 2005-07-01. The part which remains insoluble is the xylene cold insoluble (XCI) fraction.

Melting Temperature (T$_m$) and Heat of Fusion (H$_f$), Crystallization Temperature (T$_c$) and Heat of Crystallization (H$_c$):
measured with Mettler TA820 differential scanning calorimetry (DSC) on 5 to 10 mg samples. DSC is run according to ISO 11357-3:1999 in a heat/cool/heat cycle with a scan rate of 10° C./min in the temperature range of +23 to +210° C. Crystallization temperature and heat of crystallization (H$_c$) are determined from the cooling step, while melting temperature and heat of fusion (H$_f$) are determined from the second heating step Flexural Modulus:
The flexural modulus was determined in 3-point-bending at 23° C. according to ISO 178 on 80×10×4 mm$^3$ test bars injection moulded in line with EN ISO 1873-2.

Tensile modulus in machine direction was determined according to ISO 527-3 at 23° C. on 50 µm cast film produced on a monolayer cast film line with a melt temperature of 220° C. and a chill roll temperature of 20° C. Testing was performed at a cross head speed of 1 mm/min.

Total Penetration Energy:
The impact strength of films is determined by the "Dynatest" method according to ISO 7725-2 on monolayer cast films with a thickness of 50 µm. The value "Wbreak" [J/mm] represents the total penetration energy per mm thickness that a film can absorb before it breaks. The higher this value, the tougher the material is.

Haze is determined according to ASTM D 1003-07 on 60×60×1 mm³ plaques injection moulded in line with EN ISO 1873-2 using a melt temperature of 200° C.

Haze is determined according to ASTM D1003-00 on cast films of 50 μm thickness produced on a monolayer cast film line with a melt temperature of 220° C. and a chill roll temperature of 20° C.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature till processed further.

2. Examples

The catalyst used in the polymerization process for examples RAHECOS 1 to 4 has been produced as follows: First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390. As co-catalyst triethylaluminium (TEAL) and as donor dicyclo pentyl dimethoxy silane (D-donor) was used. The aluminium to donor ratio is indicated in table 1.

For RAHECO 4 the catalyst was prepolymerized with vinyl cyclohexane in an amount to achieve a concentration of 200 ppm poly(vinyl cyclohexane) (PVCH) in the final polymer. The respective process is described in EP 1 028 984 and EP 1 183 307.

The resulting polymers were visbroken in a co-rotating twin-screw extruder (type: Coperion ZSK 57) with suitable amounts of 2,5-dimethyl-2,5-di-(tert. butylperoxy)hexane (Trigonox® 101 supplied by AKZO Nobel, Netherlands) added to the extruder as concentrate of 1 wt.-% on polypropylene powder. As additives 0.04 wt. % synthetic hydrotalcite (DHT-4A supplied by Kisuma Chemicals, Netherlands) and 0.15 wt % Irganox B 215 (1:2-blend of Irganox 1010 (Pentaerythrityl-tetrakis(3-(3',5'-di-tert.butyl-4-hydroxytoluoyl)-propionate and tris (2,4-di-t-butylphenyl)phosphate) phosphite) of BASF AG, Germany were added to the polymers in the same step.

TABLE 1

Polymerization conditions and properties for the RAHECOs 1 to 4

|  |  | RAHECO 1 | RAHECO 2 | RAHECO 3 | RAHECO 4 |
| --- | --- | --- | --- | --- | --- |
| TEAL/D | [mol/mol] | 10 | 11 | 15 | 15 |
| Loop |  |  |  |  |  |
| $MFR_2$ | [g/10 min] | 1.4 | 1.3 | 2.6 | 2.5 |
| C2 content | [wt.-%] | 2.0 | 1.9 | 3.9 | 4.2 |
| XCS | [wt.-%] | 4.0 | 4.2 | 4.4 | 3.6 |
| C2/C3 ratio | [mol/kmol] | 4.8 | 4.8 | 4.5 | 5.1 |
| 1 GPR |  |  |  |  |  |
| $MFR_2$ | [g/10 min] | 1.0 | 1.1 | 0.7 | 0.7 |
| C2 content | [wt.-%] | 7.3 | 7.2 | 10.6 | 11.2 |
| XCS | [wt.-%] | 29.5 | 30.0 | 37.9 | 38.9 |
| C2/C3 ratio | [mol/kmol] | 117 | 111 | 159 | 200 |
| 2 GPR |  |  |  |  |  |
| $MFR_2$ | [g/10 min] | 1.2 | 1.2 | 1.5 | 1.5 |
| C2 content | [wt.-%] | 10.1 | 7.7 | 1.5 | 1.5 |
| XCS | [wt.-%] | 33.7 | 28.6 | 48.3 | 48.7 |
| C2 of XCS | [wt.-%] | 20.2 | 16.5 | 20.2 | 19.3 |
| C2/C3 ratio | [mol/kmol] | 304 | 146 | 148 | 154 |
| 3 GPR |  |  |  |  |  |
| $MFR_2$ | [g/10 min] | 1.1 | 1.2 | 1.5 | 1.8 |
| C2 content | [wt.-%] | 11.8 | 9.3 | 11.3 | 12.1 |
| XCS | [wt.-%] | 42.7 | 41.9 | 49.1 | 50.9 |
| C2 of XCS | [wt.-%] | 22.5 | 16.8 | 19.4 | 19.2 |
| IV of XCS | [dl/g] | 1.9 | 1.9 | 2.5 | 2.2 |
| C2/C3 ratio | [mol/kmol] | 304 | 152 | 150 | 159 |
| Split |  |  |  |  |  |
| Loop | [wt.-%] | 41.4 | 41.1 | 37.3 | 36.1 |
| 1GPR | [wt.-%] | 39.9 | 41.9 | 44.6 | 44.3 |
| (2GPR + 3GPR) | [wt.-%] | 18.7 | 17.0 | 18.9 | 19.6 |
| Visbreaking |  |  |  |  |  |
| POX | [wt.-%] | 0.01 | 0.011 | 0.013 | 0.015 |
| $MFR_2$ | [g/10 min] | 3.4 | 3.6 | 3.1 | 3.5 |
| Tm | [° C.] | 147 | 147 | 149 | 151 |

TABLE 1-continued

Polymerization conditions and properties for the RAHECOs 1 to 4

|  |  | RAHECO 1 | RAHECO 2 | RAHECO 3 | RAHECO 4 |
|---|---|---|---|---|---|
| XCS | [wt.-%] | 41 | 37 | 47 | 48 |
| IV of XCS | [dl/g] | 1.9 | 2.0 | 2.0 | 2.1 |

C2 ethylene
IV intrinsic viscosity
$H_2$/C3 ratio hydrogen/propylene ratio
C2/C3 ratio ethylene/propylene ratio
POX 2,5-dimethyl-2,5-di-(tert. butylperoxy)hexane
1/2/3 GPR 1/2/3 gas phase reactor
Loop Loop reactor

TABLE 2

Properties of the styrene-ethylene/butylene-styrene (SEBS) block copolymers

|  |  | SEBS-1 | SEBS-2 |
|---|---|---|---|
| type |  | Kraton G 1645M | Kraton G 1652M |
| styrene | [wt.-%] | 12.5 | 30 |
| Shore A | [—] | 35 | 69 |
| $MFR_2$ (230° C.) | [g/10 min] | 2.0 | 5.0 (230° C./5 kg) |
| density | [g/cm³] | 0.900 | 0.910 |

Kraton G 1645M and Kraton G 1652M are supplied by Kraton Polymers LLC

TABLE 3

Properties of PP1 and PP2

|  |  | PP1 | PP2 |
|---|---|---|---|
| MFR total | [g/10 min] | 1.9 | 3.9 |
| MFR matrix | [g/10 min] | 1.9 | 3.9 |
| XCS | [wt.-%] | 8.5 | 23 |
| C2 of XCS | [wt.-%] | n.d. | 25 |
| IV of XCS | [dl/g] | n.d. | 1.3 |
| C2 total | [wt.-%] | 4.2 | 8.0 |
| Tm | [° C.] | 140 | 141 |

PP1 is the commercial product BorPure RB501BF and PP2 Bormed SC820CF. Both products are available from Borealis AG.

TABLE 4 (a)

Properties of comparative examples

|  |  | CE 1 | CE 2 | CE 3 | CE 4 | CE 5 | CE 6 |
|---|---|---|---|---|---|---|---|
| PP1 | [wt.-%] | — | — | — | 100 | 63 | — |
| PP2 | [wt.-%] | 100 | 75 | 75 | — | — | — |
| RAHECO 1 | [wt.-%] | — | — | — | — | — | 100 |
| RAHECO 2 | [wt.-%] | — | — | — | — | — | — |
| RAHECO 3 | [wt.-%] | — | — | — | — | — | — |
| RAHECO 4 | [wt.-%] | — | — | — | — | — | — |
| SEBS-1 | [wt.-%] | — | 25 | — | — | 37 | — |
| SEBS-2 | [wt.-%] | — | — | 25 | — | — | — |
| MFR | [g/10 min] | 3.8 | 4.5 | 3.5 | 4.5 | 3.1 | 3.4 |
| Injection molded plaque |  |  |  |  |  |  |  |
| Flexural modulus | [MPa] | 555 | 189 | 400 | 696 | 152 | 284 |
| Haze, b.s. | [%] | 47 | 41 | 24 | 41 | 17 | 33 |
| Haze, a.s. | [%] | 63 | 58 | 32 | 55 | 20 | 49 |
| delta Haze | [%] | 16 | 18 | 8 | 14 | 4 | 17 |
| 50 μm film |  |  |  |  |  |  |  |
| Wbreak 0° C., b.s. | [J/mm] | 17 | 18 | 18 | 2.8 | 18 | — |
| Wbreak 0° C., a.s. | [J/mm] | 10 | 15 | 14 | 4.0 | 16 | — |
| Haze, b.s. | [%] | 4.6 | 2.6 | 17.8 | 1.9 | 0.4 | 6 |
| Haze, a.s. | [%] | 12 | 10 | 23 | 17 | 6.4 | 12 |
| delta Haze | [%] | 7.6 | 7.0 | 5.5 | 14.6 | 6.0 | 5.3 |
| Tensile modulus MD, b.s. | [MPa] | 337 | 119 | 264 | 393 | 88 | 207 |
| Tensile modulus MD, a.s. | [MPa] | 599 | 207 | 428 | 660 | 115 | 200 |
| delta Tensile modulus | [MPa] | 262 | 88 | 164 | 267 | 27 | 7 |

TABLE 4 (b)

Properties of inventive and comparative examples

|  |  | IE 1 | CE 7 | IE 2 | CE 8 | CE 9 |
|---|---|---|---|---|---|---|
| PP1 | [wt.-%] | — | — | — | — | — |
| PP2 | [wt.-%] | — | — | — | — | — |
| RAHECO 1 | [wt.-%] | 75 | — | — | — | — |
| RAHECO 2 | [wt.-%] | — | 100 | 75 | — | — |
| RAHECO 3 | [wt.-%] | — | — | — | 100 | 93 |
| RAHECO 4 | [wt.-%] | — | — | — | — | — |
| SEBS-1 | [wt.-%] | 25 | — | 25 | — | 7 |
| SEBS-2 | [wt.-%] | — | — | — | — | — |
| MFR | [g/10 min] | 4.5 | 3.6 | 4.5 | 3.1 | 4.0 |
| Injection molded plaque |  |  |  |  |  |  |
| Flexural modulus | [MPa] | 90 | 319 | 115 | 254 | 177 |
| Haze, b.s. | [%] | 19 | 30 | 13 | 30 | 24 |
| Haze, a.s. | [%] | 37 | 41 | 25 | 47 | 45 |
| delta Haze | [%] | 18 | 10 | 12 | 18 | 22 |
| 50 μm film |  |  |  |  |  |  |
| Wbreak 0° C., b.s. | [J/mm] | 26 |  | 19 |  | 17 |
| Wbreak 0° C., a.s. | [J/mm] | 15 |  | 15 |  | 12 |
| Haze, b.s. | [%] | 1.6 | 6 | 4.8 | 13 | 17 |
| Haze, a.s. | [%] | 12 | 22 | 29 | 25 | 37 |
| delta Haze | [%] | 10.5 | 16.1 | 23.7 | 11.6 | 20.0 |
| Tensile modulus MD, b.s. | [MPa] | 57 | 240 | 72 | 198 | 110 |
| Tensile modulus MD, a.s. | [MPa] | 62 | 215 | 73 | 171 | 131 |
| delta Tensile modulus | [MPa] | 5 | −25 | 1 | −27 | 21 |

TABLE 4 (c)

Properties of inventive and comparative examples

|  |  | IE 3 | IE 4 | CE 10 | CE 11 | CE 12 | IE 5 |
|---|---|---|---|---|---|---|---|
| PP1 | [wt.-%] | — | — | — | — | — |  |
| PP2 | [wt.-%] | — | — | — | — | — |  |
| RAHECO 1 | [wt.-%] | — | — | — | — | — |  |
| RAHECO 2 | [wt.-%] | — | — | — | — | — |  |
| RAHECO 3 | [wt.-%] | 85 | 75 | 75 | — | — |  |
| RAHECO 4 | [wt.-%] | — | — | — | 100 | 93 | 75 |
| SEBS-1 | [wt.-%] | 15 | 25 | — | — | 7 | 25 |
| SEBS-2 | [wt.-%] | — | — | 25 | — | — |  |
| MFR | [g/10 min] | 4.6 | 4.0 | 3.7 | 3.5 | 4.2 | 4.7 |
| Injection molded plaque |  |  |  |  |  |  |  |
| Flexural modulus | [MPa] | 135 | 85 | 201 | 290 | 212 | 102 |
| Haze, b.s. | [%] | 19 | 14 | 25 | 25 | 23 | 18 |
| Haze, a.s. | [%] | 39 | 34 | 37 | 39 | 40 | 34 |
| delta Haze | [%] | 20 | 20 | 12 | 14 | 17 | 15 |
| 50 μm film |  |  |  |  |  |  |  |
| Wbreak 0° C., b.s. | [J/mm] | 23 | 25 | 21 |  | 17 | 22 |
| Wbreak 0° C., a.s. | [J/mm] | 14 | 16 | 15 |  | 13 | 16 |
| Haze, b.s. | [%] | 11 | 5 | 10 | 9 | 15 | 7.5 |
| Haze, a.s. | [%] | 35 | 30 | 18 | 21 | 41 | 26 |
| delta Haze | [%] | 23.4 | 25.4 | 7.6 | 12.3 | 25.6 | 18.0 |
| Tensile modulus MD, b.s. | [MPa] | 82 | 52 | 132 | 190 | 108 | 54 |
| Tensile modulus MD, a.s. | [MPa] | 86 | 46 | 161 | 164 | 150 | 53 |
| delta Tensile modulus | [MPa] | 4 | −6 | 31 | −26 | 42 | −1 |

The invention claimed is:

1. Polymer composition comprising:
    (a) a propylene copolymer (A) having:
        (a1) a melt flow rate $MFR_2$ (230° C.) measured according to ISO 1133 in the range of more than 2.0 to 15.0 g/10 min,
        (a2) a comonomer content in the range of more than 7.5 to 16.5 wt. %, and
        (a3) a xylene cold soluble content (XCS) determined according to ISO 16152 (25° C.) in the range of 25.0 to 55.0 wt. %, wherein,
        (a4) the comonomer content of xylene cold soluble (XCS) fraction of the propylene copolymer (A) is in the range of 14.0 to 30.0 wt. %, and
        (a5) an intrinsic viscosity (IV) of the xylene cold soluble (XCS) fraction of the propylene copolymer (A) is in the range of equal or more than 1.5 to equal or below 3.0 dl/g, wherein the intrinsic viscosity (IV) is determined according to DIN ISO 1628/1 (in Decalin at 135° C.), and
    (b) styrenic based elastomer(s) (B) having a styrene content in the range of 5 to equal or below 15 wt. %,
    wherein further the weight ratio of propylene copolymer (A) and the styrenic based elastomer(s) (B) [(A)/(B)] is in the range of 9/1 to 3/2.

2. Polymer composition according to claim 1, wherein the propylene copolymer (A):
    (a) has a melt flow rate $MFR_2$ (230° C.) measured according to ISO 1133 in the range of more than 2.5 to below 5.0 g/10 min, and/or
    (b) fulfills inequation (I):

$$0.3 \leq \frac{Co\ (total)}{Co\ (XCS)} \leq 0.7$$

wherein, Co (total) is the comonomer content [wt. %] of the propylene copolymer (A),
    Co (XCS) is the comonomer content [wt. %] of the xylene cold soluble fraction (XCS) of the propylene copolymer (A), and/or
    (c) fulfills inequation (II):

$$\frac{Co\ (total)}{XCS} \leq 0.30$$

wherein, Co (total) is the comonomer content [wt. %] of the propylene copolymer (A),
    XCS is the content of the xylene cold soluble fraction (XCS) [wt. %] of the propylene copolymer (A).

3. Polymer composition according to claim 1, wherein the xylene cold insoluble (XCI) fraction of the propylene copolymer (A) has a comonomer content in the range of 1.5 to 6.0 wt. %.

4. Polymer composition according to claim 1, wherein the propylene copolymer (A) is a heterophasic propylene copolymer (RAHECO) comprising a matrix (M) and an elastomeric propylene copolymer (E) dispersed in said matrix (M), wherein said matrix (M) is a random propylene copolymer (R-PP).

5. Polymer composition according to claim 4, wherein:
    (a) the weight ratio between the matrix (M) and the elastomeric propylene copolymer (E) is 50/50 to 90/10, and/or
    (b) the comonomer content of the random propylene copolymer (R-PP) is in the range of 3.0 to 12.0 wt. %, and/or
    (c) the random propylene copolymer (R-PP) has a xylene cold soluble (XCS) fraction in the range of 5.0 to 50.0 wt. %.

6. Polymer composition according to claim 4, wherein the elastomeric propylene copolymer (E) has a comonomer content in the range of 14.0 to 35.0 wt. %.

7. Polymer composition according to claim 1, wherein the styrenic based elastomer(s) (B) is(are) (a) styrene-ethylene/ butylene-styrene (SEBS) block copolymer(s) (B-1) and/or (a) hydrogenated styrene-vinyl isoprene (SIS) block rubber(s) (B-2).

8. Polymer composition according to claim 1, wherein the polymer composition comprises as styrenic based elastomer(s) (B) only (a) styrene-ethylene/butylene-styrene (SEBS) block copolymer(s) (B-1) and/or (a) hydrogenated styrene-vinyl isoprene (SIS) block rubber(s) (B-2).

9. Polymer composition according to claim 1, wherein the styrenic based elastomer (B) has a melt flow rate $MFR_2$ (230° C.) of below 10.0 g/10 min.

10. Polymer composition according to claim 1, wherein the styrenic based elastomer(s) (B) has a density of below 0.905 g/m³.

11. A film, comprising the polymer composition as defined in claim 1.

12. A container, comprising a film, the film including a polymer composition, the polymer composition comprising:
(a) a propylene copolymer (A) having:
  (a1) a melt flow rate MFR2 (230° C.) measured according to ISO 1133 in the range of more than 2.0 to 15.0 g/10 min,
  (a2) a comonomer content in the range of more than 7.5 to 16.5 wt. %, and
  (a3) a xylene cold soluble content (XCS) determined according to ISO 16152 (25° C.) in the range of 25.0 to 55.0 wt. %, wherein,
  (a4) the comonomer content of xylene cold soluble (XCS) fraction of the propylene copolymer (A) is in the range of 14.0 to 30.0 wt. %, and
  (a5) an intrinsic viscosity (IV) of the xylene cold soluble (XCS) fraction of the propylene copolymer (A) is in the range of equal or more than 1.5 to equal or below 3.0 dl/g, wherein the intrinsic viscosity (IV) is determined according to DIN ISO 1628/1 (in Decalin at 135° C.), and
(b) styrenic based elastomer(s) (B) having a styrene content in the range of 5 to equal or below 15 wt. %,
wherein further the weight ratio of propylene copolymer (A) and the styrenic based elastomer(s) (B) [(A)/(B)] is in the range of 9/1 to 3/2.

13. The container according to claim 12, wherein the container or the film has been subjected to a sterilisation treatment.

* * * * *